Feb. 10, 1942.　　　G. W. MORK　　　2,272,221

WHEELED SCRAPER

Filed Nov. 4, 1939　　　3 Sheets-Sheet 1

George W. Mork.
INVENTOR.

BY Hoar, Ruhloff & Arnaud
ATTORNEYS.

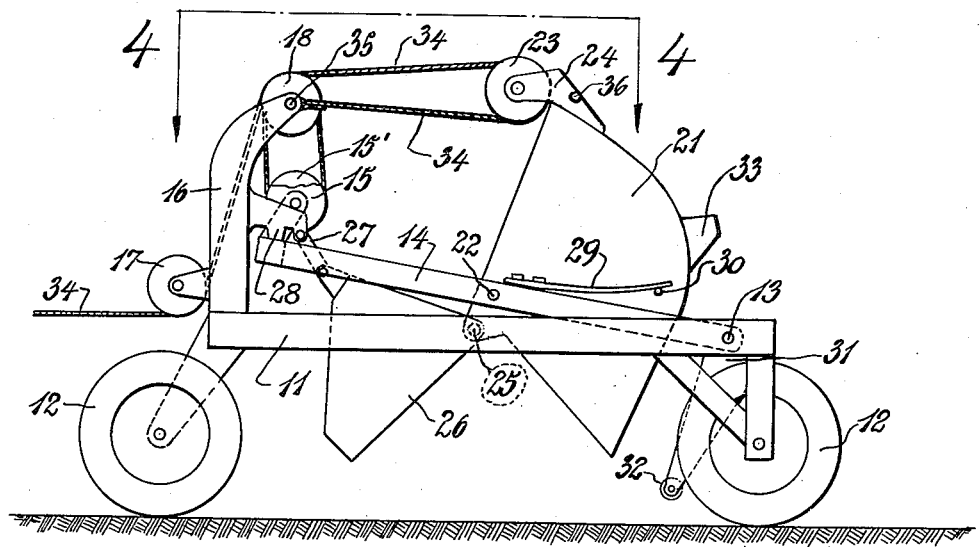
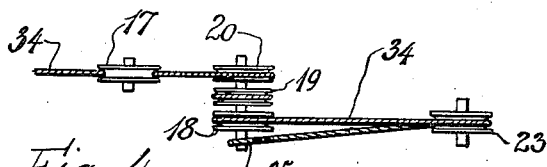
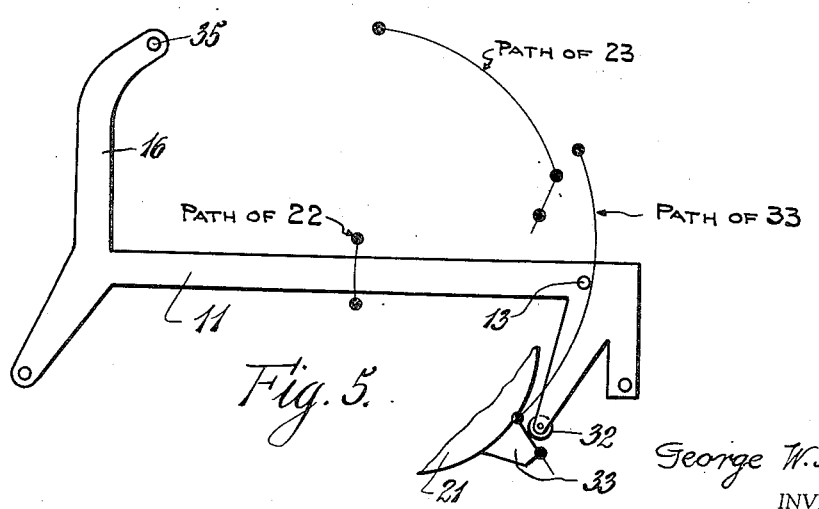

Patented Feb. 10, 1942

2,272,221

UNITED STATES PATENT OFFICE 2,272,221

WHEELED SCRAPER

George W. Mork, South Milwaukee, Wis., assignor to Bucyrus-Erie Company, South Milwaukee, Wis., a corporation of Delaware Application November 4, 1939, Serial No. 302,838

14 Claims. (Cl. 37—126)

My invention relates to new and useful improvements in wheeled scrapers, and more particularly to that type of such scrapers in which the bowl both fills and dumps at its forward end. An apron is provided to close the front end of the bowl when in its carrying position, and this apron opens automatically in both the digging position and the dumping position.

It is the principal object of my present invention to provide means whereby a scraper of the above-defined type can be controlled and optionally put into any one of its three positions by means of a single rope actuated by the winch of the tractor which drags the scraper.

It is a further object of my invention to provide means to prevent the bowl from overtipping, when dumping out large stones or lumps of dirt, or when encountering obstacles on the ground.

In addition to my principal objects, above stated, I have worked out a number of novel and useful details, which will be readily evident as the description progresses.

My invention consists in the novel parts and in the combinations and arrangements thereof, which are defined in the appended claims, and of which two embodiments are exemplified in the accompanying drawings, which are hereinafter particularly described and explained.

Throughout the description, the same reference number is applied to the same member or to similar members.

Figure 3 is a side elevation of this same embodiment, with its bowl in dumping position.

Figure 4 is a reeving diagram of this same embodiment, largely diagrammatic, taken along the lines 4—4 of Figure 3.

Figure 5 is a geometrical diagram showing the lines of motion of certain points on the bowl of this same embodiment, in passing through the three positions.

Figure 1:
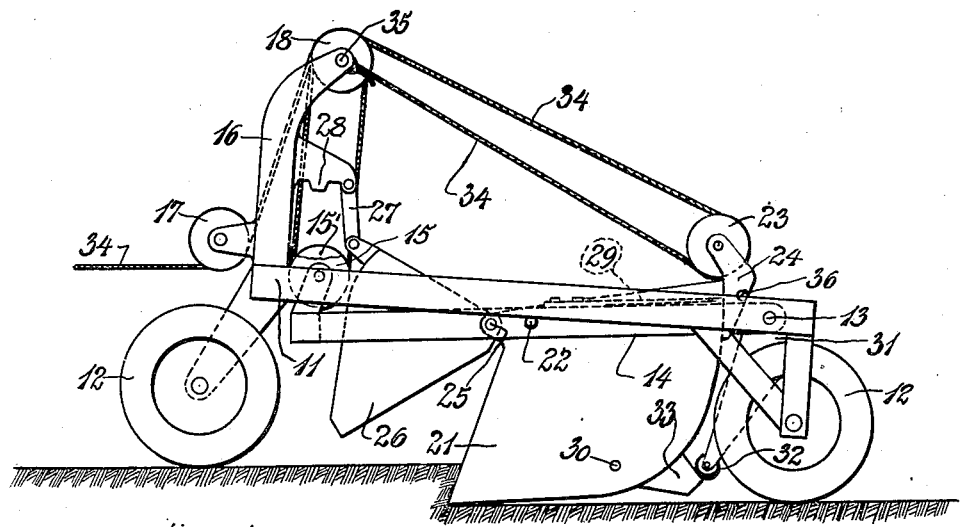
Figure 1 is a side elevation of one embodiment of my invention with its bowl in digging position.

Turning now to the embodiment of Figures 1 to 5, we see that 11 is a main frame, mounted on wheels or other ground-supported means 12. On the main frame is pivoted (preferably but not necessarily at 13) an auxiliary frame 14, carrying at its free end suspension means in the form of two sheaves 15 and 15'. The ground-engaging means could otherwise support the frames, as for example in the variant of Figures 6 and 7 described later herein, without thereby departing from the spirit of my invention.

At the forward end of main frame 11 is an elevated structure 16, carrying sheaves 17, 18, 19 and 20.

The auxiliary frame could be otherwise pivoted, and the elevated structure could be otherwise located, without thereby departing from the spirit of my invention and the elevated structure correspondingly moved to the rear end of the main frame.

A digging bowl 21, pivoted at 22 to auxiliary frame 14, carries at its upper rear edge supporting sheave 23, on bracket 24. At a point 25 on the bowl, forward of pivot 22, there is pivoted to the bowl an apron 26. The front end of this apron is connected by link or links 27 to elevated structure 16.

The apron 26, instead of being pivoted to the point 25 on the bowl 21, might just as well be pivoted elsewhere, without thereby departing from the spirit of my invention.

The upward motion of the front end of auxiliary frame 14 is restricted by butting against stop 28 carried by elevated structure 16.

On each side of auxiliary frame 14 is a leaf-spring 29, adapted to engage stop 30 on the side of bowl 21, when the bowl is in dumping position, thus yieldably resisting too much tipping of the bowl, when dumping out large stones or lumps of dirt, or when encountering obstacles on the ground. These springs might just as well be carried otherwise, or other equivalent resilient or non-resilient devices might just as well be substituted.

A brace 31, terminating in a roller 32, is carried by the main frame. The motion of the bowl, in passing from carrying position (Figure 2) to digging position (Figure 1) is such that cam 33 passes in front of roller 32 and then rearwardly to engage it.

The shape of cam 33, which engages roller 32, is determined as set forth later herein.

Other forms of brace-means than roller 32 could, of course, be used.

Figure 2:
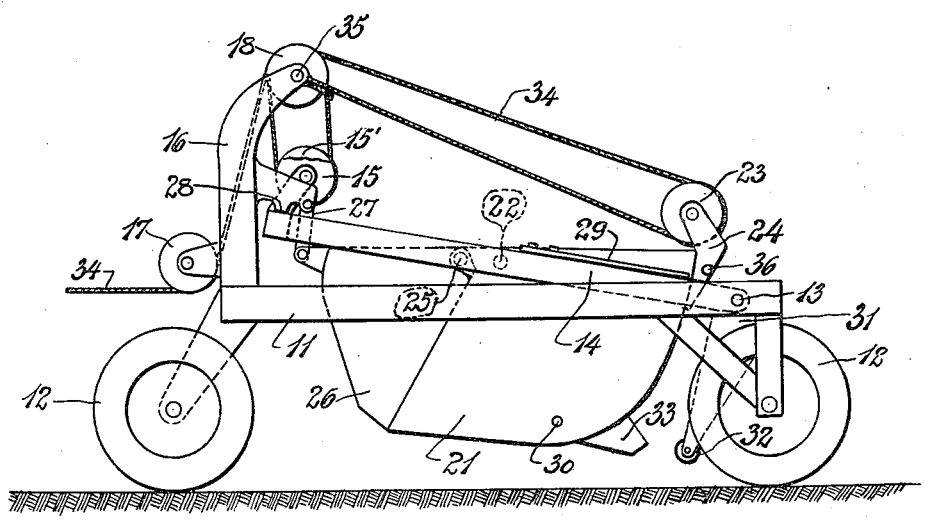
Figure 2 is a side elevation of this same embodiment, with its bowl in carrying position.

Passing laterally through the bracket 24 which carries the sheave 23 on the rear of the bowl 21, there may be a rod 36, adapted to rest on the auxiliary frame 14, as shown in Figure 1, and thus limiting the downward tilt of the rear of the bowl. Any equivalent stop means for this purpose could be employed. In fact, this stop means exists merely for emergency purposes, and probably is unnecessary, inasmuch as in carrying position (as shown in Figure 2) the contact between the apron 26 and the bowl 21 restrains such tipping, and in digging position (as shown in Figure 1) the digging reaction will force the cam 33 into contact with roller 32, and will restrain such tipping. Accordingly when, in my claims I allude to stop means for this purpose, I intend any or all of these three expedients, or their equivalents.

The single control rope 34 will now be traced. This rope extends from a winch (not shown) on the tractor (not shown) which pulls my scraper, under sheave 17 and over sheave 20, thence down and around sheave 15', thence up and over sheave 19, thence down and around the sheave 15, thence up and over sheave 18, thence rearwardly over and around sheave 23, and thence forwardly to an anchorage 35 on the elevated structure 16.

Thus we see that there are four reaches tending to lift the forward end of auxiliary frame 14, and two reaches tending to tilt up the bowl. The number of reaches, weights, lever-arms, and directions of pull should be so proportioned that there will be no tendency to tilt the bowl, so long as the auxiliary frame is free to rise.

Accordingly, starting with the digging position as shown in Figure 1, the first pulling-in of rope 34 by the winch on the tractor will raise the auxiliary frame, causing stop 33 to disengage from roller 32, and causing the apron to close upon the bowl, as shown in Figure 2.

Inasmuch as the auxiliary frame is now butting against stop 28, and hence can be raised no further, the continued pulling-in of rope 34 will now act on the sheaves at the rear of the bowl, tilting the bowl to dumping position as shown in Figure 3, and opening the apron.

After the release of rope 34, spring 29 will tend to initiate the return of the bowl to the position shown in Figure 2.

Although the use of a single control rope, as just described, is one of the important features of my invention, the use of more than one rope to attain the same cycle would not depart from the spirit of my invention.

Figure 5 shows the paths taken by the pivot-point 22, by the center of sheave 23, and by the rear tip of cam 33. Let us trace these paths, starting with the upper dot of each, which represents the locations of the three points in dumping position (Figure 3).

As rope 34 is paid out, the auxiliary frame 14 remains up against its stop 28, and the bowl 21 rotates (clockwise, as shown in the figures) about pivot 22 (which remains in the upper position shown in Figure 5) until the apron 26 closes upon the bowl, as shown in Figure 2, the carrying position.

Points 23 and 33, having traveled in circular arcs with point 22 as their center, are now in their second location as shown.

Further paying-out of rope 34 permits the counterclockwise rotation of auxiliary frame 14 about pivot 13. Point 22 moves in a circular arc about pivot 13 as a center. The initial motion of points 23 and 33 are somewhat indeterminate, depending upon whether or not the rearward reach of rope 34 pays out, remains fixed in length, or even pulls in slightly, this in turn depending on the relative weights and proportions alluded to earlier in this specification. In general, the point 23 will move downwardly, and the point 33 will move downwardly rearwardly. But, so soon as the rod 36 (if any) makes contact with the auxiliary frame 14, and/or the cam 33 makes contact with the roller 32, the paths are again determinate. If the rod makes contact, both paths will be circular arcs about point 13 as a center. If the cam makes contact, the shape of both paths will depend upon the shape of the cam. In the variant here described and shown, the shape of the cam has been chosen such that the rearward reaches of rope 34 will neither pay out nor pull in while the cam is in contact with its roller; and accordingly the center of sheave 23 will describe a short circular arc (as shown in Figure 5) about the center of sheave 35, and the digging depth will be controlled entirely by the paying out and pulling in of the downward reaches of rope 34.

Other shapes of cam surface could be employed without departing from the spirit of my invention. The shape employed, however, has the advantage of eliminating lost motion in the rearward reaches of rope 34 during control of digging, and the further advantage that the bowl will rotate about a center of rotation considerably to the rear of pivot 13, with the consequent result of a longer lever-arm for the downward reaches of rope 34 to act upon in resisting the digging reactions.

Similar considerations can be used to determine the location and conformation of the cam-surface, in other variants of my invention.

Figure 6:
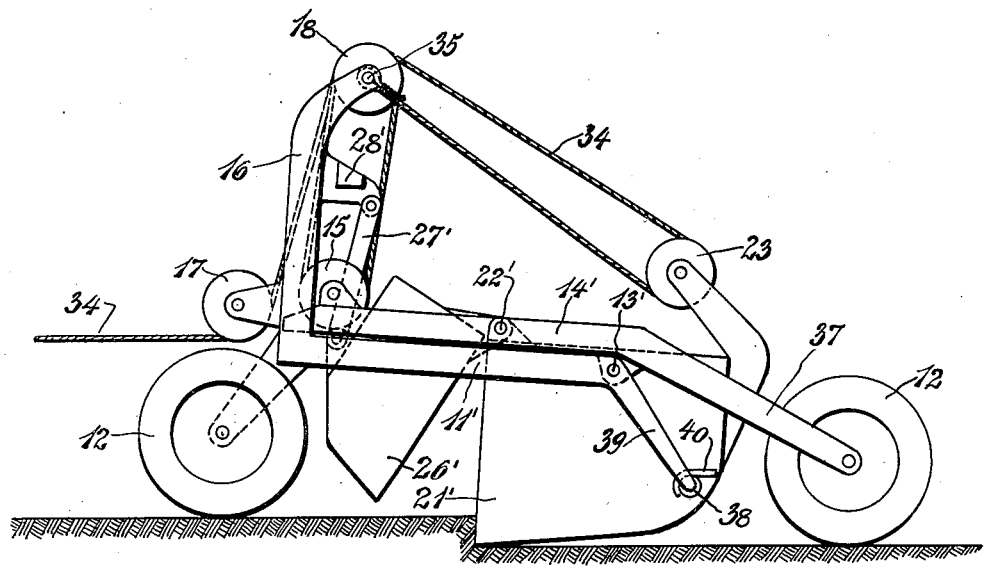
Figure 6 is a side elevation of a second embodiment of my invention, with its bowl in digging position.
Figure 7:
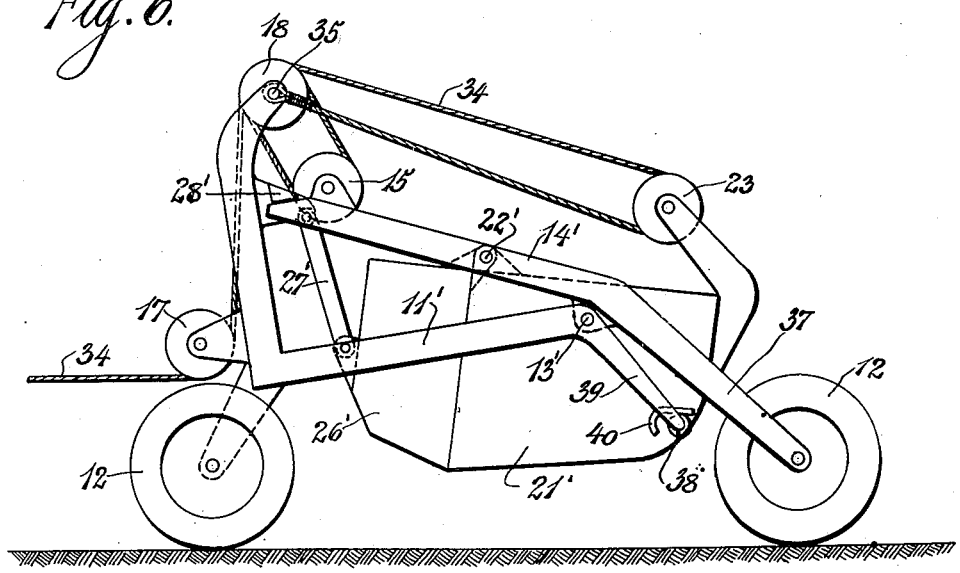
Figure 7 is a side elevation of this second embodiment, with its bowl in carrying position.

Turning now to Figures 6 and 7, let us consider the second embodiment of my invention. In this second embodiment, the same parts are given the same reference numbers as in the discussion of the first embodiment, and analogous but different parts are given the same numbers primed. Reference is now made to the discussion of the first embodiment for the description and operation of these common features.

In my second embodiment, the rear wheels 12 are now mounted on a rearward extension 37 of auxiliary frame 14', instead of, as in the first embodiment, on main frame 11'.

The rear pivot of the apron 26' is now preferably coincident with the front pivot 22' of the bowl 21'.

In place of the cam 33 engaging the roller 32 of the first embodiment, I now have a roller 38 carried by a rearwardly extending portion 39 of the main frame 11', engaging a cam-surface 40 on the bowl 21'. It will be seen that, just as the roller 32 engages the cam 33 in all digging positions (see Figure 1), and disengages it in carrying position (see Figure 2), so as not to interfere with the bowl passing to dumping position (Figure 3); so likewise the roller 38 engages cam-surface 40 in all digging positions (see Figure 6), and disengages it in carrying position (see Figure 7), so as not to interfere with the bowl passing to dumping position (not shown for this variant).

Note also (comparing Figure 7 with Figure 2) that in carrying position the rear of the bowl rises more clear of the ground in my second embodiment than in my first.

Having now described and illustrated two forms of my invention, and having discussed several departures from each such form therefrom, I wish it to be understood that my invention is not to be limited to the specific forms or arrangements of parts herein described and/or shown, except insofar as specifically covered by my claims.

I claim:

1. In an earth-moving scraper, the combination of: a main frame; ground-supports for the main frame; an auxiliary frame, pivoted at its rear on pivots supported by the main frame, its front end being free to rise; a forward-dumping digging bowl, pivoted adjacent its front end on pivots supported by the auxiliary frame; means to limit the extent to which the front of the auxiliary frame can rise; an apron, pivoted adjacent its front end on pivots supported by the main frame, and adjacent its rear end on pivots supported by the auxiliary frame, and adapted to close the front opening of the bowl; single control means, applied to the front of the auxiliary frame and to the rear of the bowl, and adapted first to raise the auxiliary frame to its limit, and then to tilt the bowl, whereby the front of the bowl is first raised from digging position to carrying position and the apron closes on the bowl, and then the rear of the bowl is raised to dumping position and the apron opens again; and brace means to carry digging reactions from the rear of the bowl to the main frame.

2. In an earth-moving scraper, the combination of: a main frame; ground-supports for the main frame; an auxiliary frame, pivoted on pivots supported by the main frame, and having one end free to rise; a forward-dumping digging bowl, pivoted adjacent its front end on pivots supported by the auxiliary frame; means to limit the extent to which the free end of the auxiliary frame can rise; an apron, pivoted adjacent its front end on pivots supported by the main frame, and adjacent its rear end on pivots supported by the auxiliary frame, and adapted to close the front opening of the bowl; means to brace the bowl against the work, when the bowl is in digging position; and single control means, applied to the free end of the auxiliary frame and to the rear of the bowl, and adapted first to raise the auxiliary frame to its limit, and then to tilt the bowl, whereby the front of the bowl is first raised from digging position to carrying position and the apron closes on the bowl, and then the rear of the bowl is raised to dumping position and the apron opens again.

3. In an earth-moving scraper, the combination of: a main frame; ground-supports for the main frame; an auxiliary frame, pivoted on pivots supported by the main frame, and having one end free to rise; a forward-dumping digging bowl, pivoted adjacent its front end on pivots supported by the auxiliary frame; means to limit the extent to which the free end of the auxiliary frame can rise; an apron, pivoted adjacent its front end on pivots supported by the main frame, and adjacent its rear end on pivots supported by the auxiliary frame, and adapted to close the front opening of the bowl; means to brace the bowl against the work, when the bowl is in digging position; and a single rope, extending around sheaves on the main frame, and on the auxiliary frame, and on the bowl; the number of reaches of rope extending from the main frame to the auxiliary frame, and the number of reaches of rope extending from the main frame to the bowl, and the lever arms of the ropes, and the moments of inertia of the auxiliary frame and the bowl, all being such that their combined effect will be that, when the rope is pulled in, the front of the bowl will first be raised from digging position to carrying position and the apron will close on the bowl, and then the rear of the bowl will be raised to dumping position and the apron will open again.

4. In an earth-moving scraper, the combination of: a main frame; an auxiliary frame, pivoted on pivots supported by the main frame, and having one end free to rise; a forward-dumping digging bowl, pivoted on pivots supported by the auxiliary frame; ground-supports, for carrying said frames; means to limit the extent to which the free end of the auxiliary frame can rise; single control means, applied to the auxiliary frame and to the bowl, and adapted first to raise the auxiliary frame to its limit, and then to tilt the bowl, whereby the front of the bowl is first raised from digging position to carrying position, and then the rear of the bowl is raised to dumping position; brace means on the main frame; and a catch on the rear of the bowl, adapted automatically to engage the brace means when the bowl passes from carrying to digging position, and to disengage the brace means when the bowl passes from digging to carrying position.

5. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the front of the auxiliary frame can rise; an apron, pivoted on pivots supported by the main frame, and by the bowl forwardly of the front end pivot support of the bowl, and adapted to close the front opening of the bowl; single control means, applied to the auxiliary frame and to the bowl, and adapted first to raise the auxiliary frame to its limit, and then to tilt the bowl, whereby the front of the bowl is first raised from digging position to carrying position and the apron closes on the bowl, and then the rear of the bowl is raised to dumping position and the apron opens again; and brace means to carry digging reactions from the rear of the bowl to the main frame.

6. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the free end of the auxiliary frame can rise; an apron, pivoted on pivots supported by the main frame, and by the bowl forwardly of the front end pivot support of the bowl, and adapted to close the front opening of the bowl; means to brace the bowl against the work, when the bowl is in digging position; and control means, applied to the auxiliary frame and to the bowl, and adapted first to raise the auxiliary frame to its limit, and then to tilt the bowl, whereby the front of the bowl is first raised from digging position to carrying position and the apron closes on the bowl, and then the rear of the bowl is raised to dumping position and the apron opens again.

7. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the free end of the auxiliary frame can rise; an apron, pivoted on pivots supported by the main frame, and by the bowl forwardly of the front end pivot support of the bowl, and adapted to close the front opening of the bowl; means to brace the bowl against the work, when the bowl is in digging position; and a single rope, extending around sheaves on the main frame, and on the auxiliary frame, and on the bowl; the number of reaches of rope extending from the main frame to the auxiliary frame, and the number of reaches of rope extending from the main frame to the bowl, and the lever arms of the ropes, and the moments of inertia of the auxiliary frame and the bowl, all being such that their combined effect will be that, when the rope is pulled in, the front of the bowl will first be raised from digging position to carrying position and the apron will close on the bowl, and then the rear of the bowl will be raised to dumping position and the apron will open again.

8. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the front of the auxiliary frame can rise; control means, applied to the auxiliary frame and to the bowl, and adapted first to raise the auxiliary frame to its limit, and then to tilt the bowl, whereby the front of the bowl is first raised from digging position to carrying position, and then the rear of the bowl is raised to dumping position; and brace means to carry digging reactions from the rear of the bowl to the main frame.

9. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the free end of the auxiliary frame can rise; means to brace the bowl against the work, when the bowl is in digging position; and control means, applied to the free end of the auxiliary frame and to the rear of the bowl, and adapted first to raise the auxiliary frame to its limit, and then to tilt the bowl, whereby the front of the bowl is first raised from digging position to carrying position, and then the rear of the bowl is raised to dumping position.

10. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the free end of the auxiliary frame can rise; means to brace the bowl against the work, when the bowl is in digging position; and a single rope extending around sheaves on the main frame, and on the free end of the auxiliary frame, and on the bowl; the number of reaches of rope extending from the main frame to the auxiliary frame, and the number of reaches of rope extending from the main frame to the bowl, and the lever arms of the ropes, and the moments of inertia of the auxiliary frame and the bowl, all being such that their combined effect will be that, when the rope is pulled in, the front of the bowl will first be raised from digging position to carrying position, and then the rear of the bowl will be raised to dumping position.

11. In an earth-moving scraper, the combination of: a main frame; an auxiliary frame, pivoted on pivots supported by the main frame, and having one end free to rise; ground-supports, for carrying said frame; a forward-dumping digging bowl, pivoted on pivots supported by the auxiliary frame; means to limit the extent to which the free end of the auxiliary frame can rise; means to brace the bowl against the work, when the bowl is in digging position; control means, applied to the free end of the auxiliary frame, and to the bowl, and adapted first to raise the auxiliary frame to its limit, and then to tilt the bowl, whereby the front of the bowl is first raised from digging position to carrying position, and then the rear of the bowl is raised to dumping position; and resilient means to restrain excessive raising of the rear end of the bowl, and to tend to lower the rear end of the bowl whenever excessively raised, said resilient means consisting of a spring supported by one of the frames, and engaging a stop on the bowl.

12. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the free end of the auxiliary frame can rise; means to brace the bowl against the work, when the bowl is in digging position; control means, applied to the auxiliary frame and to the bowl, and adapted first to raise the auxiliary frame to its limit, and then to tilt the bowl, whereby the front of the bowl is first raised from digging position to carrying position, and then the rear of the bowl is raised to dumping position; and resilient means to restrain excessive raising of the rear end of the bowl, and to tend to lower the rear end of the bowl whenever excessively raised.

13. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the free end of the auxiliary frame can rise; means to brace the bowl against the work, when the bowl is in digging position; control means, applied to the auxiliary frame and to the bowl, and adapted first to raise the auxiliary frame to its limit, and then to tilt the bowl, whereby the front of the bowl is first raised from digging position to carrying position, and then the rear of the bowl is raised to dumping position; and means to restrain excessive raising of the rear end of the bowl.

14. In an earth-moving scraper, the combination of: a main frame; an auxiliary frame, pivoted on pivots supported by the main frame, and having one end free to rise; ground-supports, for carrying said frames; a forward-dumping digging bowl, pivoted on pivots supported by the auxiliary frame; means to limit the extent to which the free end of the auxiliary frame can rise; control means, applied to the auxiliary frame and to the bowl, and adapted first to raise the auxiliary frame to its limit, and then to tilt the bowl, whereby the front of the bowl is first raised from digging position to carrying position, and then the rear of the bowl is raised to dumping position; brace means carried by the frame behind the bowl; and a stop on the rear of the bowl, so positioned that it will engage the brace in all digging positions, and will disengage it when passing from carrying to dumping position.

GEORGE W. MORK.